Jan. 1, 1935.  W. C. HOPSON  1,985,995
POULTRY FOUNTAIN
Filed July 24, 1933
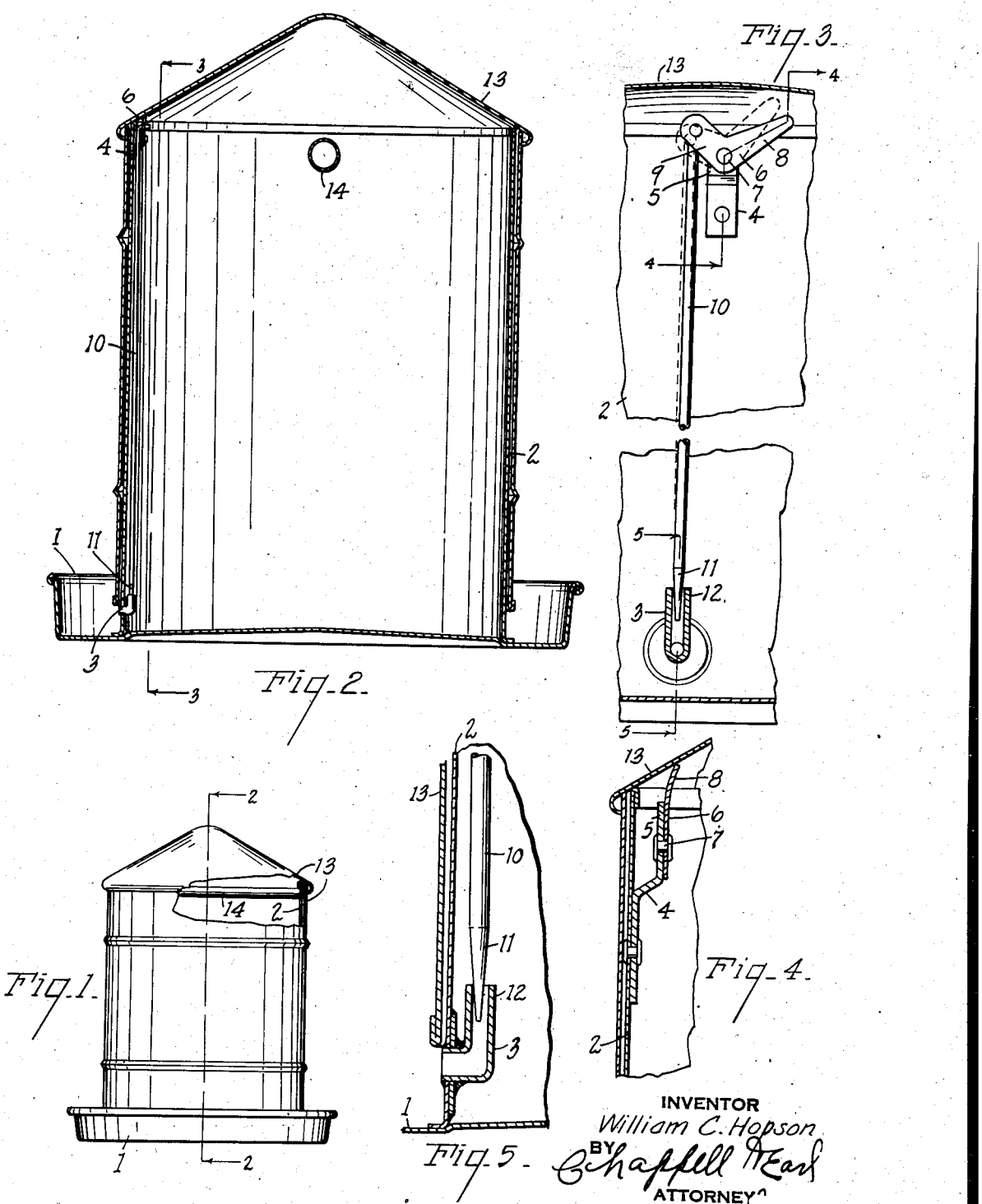
INVENTOR
William C. Hopson
BY Chappell Earl
ATTORNEY Patented Jan. 1, 1935

1,985,995

UNITED STATES PATENT OFFICE 1,985,995

POULTRY FOUNTAIN

William C. Hopson, Grand Rapids, Mich., assignor to W. C. Hopson Company, Grand Rapids, Mich.

Application July 24, 1933, Serial No. 681,828

5 Claims. (Cl. 119—77)

The main objects of this invention are:

First, to provide a poultry or stock fountain having an improved outlet valve which is adapted to close by gravity when the cover is removed and be opened when the cover is replaced and held open by the cover so long as the latter remains in place.

Second, to provide a valve operating mechanism of this character, which is simple and economical in its parts and quite efficient and effective in operation.

Objects relating to details and economies of my invention will appear from the description to follow.

A structure which is a preferred embodiment of my invention is illustrated in the accompanying drawing, in which:

Fig. 1 is a view in side elevation of a poultry fountain embodying the features of my invention, portions of the cover and reservoir being broken away and shown in vertical section.

Fig. 2 is an enlarged transverse vertical section on a line corresponding to line 2—2 of Fig. 1.

Fig. 3 is an enlarged fragmentary detail section on a line corresponding to line 3—3 of Fig. 2.

Fig. 4 is a detail section on line 4—4 of Fig. 3.

Fig. 5 is a detail section on line 5—5 of Fig. 3.

Referring to the drawing which illustrates a preferred embodiment of my invention, numeral 1 indicates a pan or trough within which is mounted a liquid reservoir 2. An outlet fitting 3 of L-shape is mounted in the wall of the reservoir within the pan.

A bracket 4 is mounted on the wall of the reservoir near the top thereof and is provided with an inwardly offset upper portion 5. A bell crank lever 6 is pivoted to the inwardly offset portion of the bracket at 7 and has a long arm 8 projecting above the top of the reservoir and a short arm 9 from which depends the rod 10.

The rod 10 terminates at its lower end in a tapered valve 11 disposed within the upright 12 of the L-shaped fitting  The valve is closed by gravity due to the weight of the rod 10 when the cover 13 is removed. While in place, however, the cover 13 engages the long arm 8 of the bell crank lever and elevates the rod 10 so as to hold the valve 11 in open position. The taper of the valve is such that the point of the valve is not withdrawn from the fitting even when the lever is fully depressed by the cover. With this arrangement, no supports or guides are required other than the lever and the fitting.

With the parts arranged in this manner, the cover 13 may be removed and the reservoir 2 filled with water without overflowing the trough, the valve closing on the removal of the cover. The replacement of the cover results in the opening of the valve and the normal operation of the fountain.

The reservoir 2 is provided near its upper end with a transverse tubular handle 14 which may be used for carrying the fountain while the cover is removed.

Having thus described my invention, what I claim as new and desire to secure by Letters Patent is:

1. A fountain of the class described, comprising in combination a trough, a reservoir mounted on said trough, an outlet fitting of L-shape mounted in the wall of said reservoir within said trough, a bracket on the wall of said reservoir near the top thereof, a bell crank lever pivoted to said bracket and having an arm projecting above the reservoir and a short arm, a rod depending from said short arm and terminating at its lower end in a tapered gravity closed integral valve within the upright of said outlet fitting, and a cover engaging the upwardly projecting arm of said lever to open said valve so long as the cover remains in place the cover being loosely telescoped over said reservoir and depending into said trough to provide a water seal.

2. A fountain of the class described, comprising in combination a trough, a reservoir, an outlet fitting of L-shape mounted in the wall of said reservoir, a bracket on the wall of said reservoir near the top thereof, a bell crank lever pivoted to said bracket and having an arm projecting above the reservoir and a short arm, a rod depending from said short arm and terminating at its lower end in a tapered gravity closed integral valve within the upright of said outlet fitting, and a cover engaging the upwardly projecting arm of said lever to open said valve so long as the cover remains in place the cover being loosely telescoped over said reservoir and depending into said trough to provide a water seal.

3. A fountain of the class described, comprising in combination a trough, a reservoir, an outlet fitting of L-shape mounted in the wall of said reservoir, a bracket on the wall of said reservoir, a bell crank lever pivoted to said bracket and having an arm projecting above the reservoir and an arm within the reservoir, a rod depending from said last named arm and terminating at its lower end in a tapered gravity closed integral valve disposed within the upright of said outlet fitting, and a cover adapted to engage the first named arm of said lever to open said valve so long as the cover remains in place the cover being loosely telescoped over said reservoir and depending into said trough to provide a water seal.

4. A fountain of the class described, comprising in combination a trough, a reservoir, an outlet fitting mounted in the wall of said reservoir, a bracket on the wall of said reservoir, a bell crank lever pivoted to said bracket and having an arm projecting above the reservoir and an arm within the reservoir, a rod depending from said last named arm and terminating at its lower end in a tapered gravity closed integral valve disposed within said outlet fitting, and a cover adapted to engage the first named arm of said lever to open said valve so long as the cover remains in place the cover being loosely telescoped over said reservoir and depending into said trough to provide a water seal.

5. A fountain of the class described, comprising in combination a trough, a reservoir, an outlet fitting for said reservoir discharging to said trough and having an upwardly facing arm, the upper end of which constitutes a valve seat, a bell crank lever mounted on said reservoir, a rod pivotally mounted on said bell crank lever and terminating in a tapered integral end disposed within said outlet fitting, the tapered end constituting a valve and being of such length as to constitute a guide within the fitting when the lever is in actuated position, the lever and fitting being the sole supporting and guiding means for said valve, and a cover for said reservoir engaging said lever when the cover is closed for holding the valve in open position the cover being loosely telescoped over said reservoir and depending into said trough to provide a water seal.

WILLIAM C. HOPSON.